United States Patent Office 2,826,504
Patented Mar. 11, 1958

2,826,504

METHOD OF IMPROVING THE FLAVOR OF SOLUBLE SOLID COFFEE EXTRACT

Fletcher A. Chase, Morris Plains, and Samuel Lee, Fairlawn, N. J., assignors, by mesne assignments, to American Home Products Corporation, New York, N. Y., a corporation of Delaware No Drawing. Application March 18, 1955
Serial No. 495,334

3 Claims. (Cl. 99—71)

This invention relates to a method of improving the flavor of a soluble solid coffee extract and to the resulting product. More particularly it relates to a method in which a soluble carbohydrate is added to a concentrated aqueous coffee extract, the extract is dried and the residue is heated in the approximate range 150°–225° C. (300°–440° F.) for 3–5 hours.

In the conventional manufacture of soluble solid coffee extract, commonly called "instant coffee," a concentrated aqueous extract, formed by percolation of ground roasted coffee with hot water, is spray dried. The spray-drying results in loss of desirable volatile constituents from the residue.

Many efforts have been made in the past to correct or compensate for this loss by various combinations of heat treatment with and without the addition of carbohydrates. Among these may be mentioned the disclosures of the following patents.

Gebrüder von Niessen in British Patent 7,427 of 1910 disclose the absorption of sugar syrup into the interior of coffee beans at a temperature below 100° C. prior to roasting.

In U. S. Patents 1,175,091 and 1,175,490 Von Vietinghoff describes a process of drying an aqueous extract of roasted coffee and further roasting the residue at about 225° C. for 10–20 minutes.

Weisberg in U. S. Patent 2,380,092 discloses mixing an aqueous extract of roasted coffee with a solution containing 25–30% of acid potassium phosphate or corn syrup, concentrating the mixture to a solid, compressing the solid into simulated coffee beans, and lightly roasting the latter, e. g. for 2–5 minutes at 150° C.

Holzer in U. S. Patent 2,511,712 and Swiss Patent 255,955 discloses mixing 20–30 parts of glucose or maltose with 100 parts of green coffee, partly roasting the mixture, extracting it with water, drying the extract in vacuo, and roasting the dried extract. Reichert (U. S. Patent 758,384) discloses a process similar to that of Holzer.

None of these processes achieves the favorable results of our process and none, as far as we are aware, has met with commercial success.

Other commercially unsuccessful efforts to avoid loss of the desired volatiles have involved various expedients such, for example, as freeze-drying the aqueous coffee extract to obtain a soluble solid residue.

We have discovered that if a carbohydrate is dissolved in a concentrated aqueous extract of roasted coffee, the extract evaporated to dryness, e. g. in a tray drier or under vacuum or by spray-drying, and the residue heated under the restricted time and temperature conditions described below, an instant coffee product is obtained of improved flavor, body and aroma. This is surprising in view of the failure of past efforts to attain this result. While we do not wish to commit ourselves to any reaction mechanism to account for our results it appears probable that the carbohydrate in some way reduces the partial pressure of the volatiles during evaporation of the infusion, and that in subsequent heating at caramelizing temperatures sufficient of the aroma-producing materials are retained to benefit the final product and simultaneously reactions take place which add desirable body to the flavor.

According to our invention we dissolve from 25 to 150 percent carbohydrate, based on the dissolved coffee solids, in a conventional infusion obtained in the manufacture of instant coffee. Such an infusion may contain 30–60 percent, preferably at least 40 percent, dissolved coffee solids. For example, to 60 pounds of such a 40 percent infusion may be added 40 pounds of a 60 percent carbohydrate solution. The resulting mixed solution will then consist of 52 pounds of water, 24 pounds of coffee solids and 24 pounds of carbohydrate and will thus contain 48 pounds of total dissolved solids in 100 pounds of solution, i. e. about 50 percent.

The carbohydrate used is preferably a sugar of low sweetness such as dextrose, mannose, or galactose. The preferred sugar is glucose.

We have found it desirable to evaporate the resulting solution, in a tray drier, but other methods, such as spray-drying, that minimize exposure of the solution to heat may be used.

When the solution has been evaporated to substantial dryness, e. g. 1 to 3 percent moisture, the residue is given a final heat treatment or baking for 3 to 5 hours at approximately 135°–225° C. (275°–440° F.), the shorter time being for the higher temperature and the longer time for the lower temperature. If higher temperatures and longer times are used, the coffee acquires an undesirable burnt taste and insoluble substances are formed, while shorter times and lower temperatures fail to develop improved aroma and body. During the final baking, the coffee residue acquires a spongy consistency and does not require agitation.

The following example describes one embodiment of our invention, but should not be considered as limiting its scope which is defined in the appended claims. It will be clear from this disclosure to those skilled in the art certain changes in operation can be introduced without departing from the spirit of our invention.

*Example*

1,000 lbs. of 50% solution of coffee solids in water is mixed with 625 lbs. of an 80% solution of glucose in water using a high speed heavy duty agitator. This solution is then poured into trays of a truck tray drier and gradually heated to remove all the water. A thermocouple is immersed in this liquid and when its temperature has reached 275° F. (135° C.) it may be assumed that the water of solution has been removed. The mixture is now baked for four hours at this temperature. During the baking the mixture alternately swells and collapses as the water of combination is eliminated and eventually a porous, spongy mass is obtained which has four to eight times the volume of the original material. At this point the product is still thermoplastic but upon cooling converts to a hard frangible mass. After cooling it is removed from the tray and powdered. If used full strength it produces a dark strong cup of coffee. It may also be admixed with conventional soluble coffee either in the powder form or after reconstitution with water as a beverage, wherein it contributes a definitely strong note to bland soluble coffee.

We claim:

1. In the production of soluble solid coffee extract in which a concentrated aqueous infusion of ground roasted coffee is formed, the improvement which comprises: dissolving in the concentrated coffee infusion a comestible soluble carbohydrate of low sweetness in an amount in the range 25 to 150 percent of the coffee solubles in the infusion, evaporating the infusion to substantial dryness, heat-treating the residue for a period in the range 3–5 hours at a temperature in the range 135°–225° C., the shorter time being for the higher temperature and the longer time for the lower temperature, thus converting the residue to an expanded porous thermoplastic mass, and thereafter cooling the hot mass to a porous friable solid constituting a soluble solid coffee extract having improved aroma and taste body.

2. The method of making a soluble solid coffee extract which comprises forming a concentrated aqueous extract of ground roasted coffee containing at least 40 percent coffee solubles by extraction of ground roasted coffee with hot water, adding to the extract a concentrated glucose solution containing an amount of dissolved glucose equal to the amount of coffee solubles in the extract, evaporating the extract to dryness, baking the residue at a temperature in the range 135°–225° C. for a period in the range 3–5 hours, the shorter time being for the higher temperature and the longer time for the lower temperature, thus converting the residue to an expanded porous thermoplastic mass, and thereafter cooling the residue to convert it to a porous friable solid constituting a soluble solid coffee extract having improved aroma and taste body.

3. The method defined in claim 2 in which the extract contains 50 percent coffee solubles, the glucose solution contains 80 percent glucose, the baking temperature is 135° C. and the baking period 4 hours.

References Cited in the file of this patent

UNITED STATES PATENTS

| | | |
|---|---|---|
| 758,384 | Reichert | Apr. 26, 1904 |
| 1,133,037 | Kellogg | Mar. 23, 1915 |
| 1,175,091 | Von Vietinghoff | Mar. 14, 1916 |
| 1,175,490 | Von Vietinghoff | Mar. 14, 1916 |
| 1,204,358 | Kellogg | Nov. 7, 1916 |
| 1,367,715 | Pratt et al. | Feb. 8, 1921 |
| 1,866,415 | Lorand | July 5, 1932 |
| 2,380,092 | Weisberg | July 10, 1945 |
| 2,511,712 | Holzer | June 13, 1950 |